UNITED STATES PATENT OFFICE.

HENRY V. DUNHAM, OF BAINBRIDGE, NEW YORK, ASSIGNOR TO CASEIN COMPANY OF AMERICA, OF NEW YORK, N. Y., A CORPORATION OF NEW JERSEY.

MANUFACTURE OF CASEIN.

No. 897,885.     Specification of Letters Patent.     Patented Sept. 8, 1908.

Application filed February 19, 1906. Serial No. 301,905.

*To all whom it may concern:*

Be it known that I, HENRY V. DUNHAM, a citizen of the United States, residing in Bainbridge, county of Chenango, and State of New York, whose post-office address is the same, have invented certain new and useful Improvements in the Manufacture of Casein, of which the following is a full, true, and concise specification.

My invention relates to the manufacture of casein and consists in the discovery of a practical and efficient process for precipitating casein from milk, whereby it is rendered serviceable, without further or unusual treatment, for use in arts in which it has not heretofore found a ready market. As an instance of such an art, I may mention the coating of wall-paper in which the "color" is made up ready for use in large quantities by using an acid pulp and some adhesive material.

When ordinary commercial casein, dissolved as usual in an alkali, is employed as the adhesive material, it is found that it will not properly mix with the pulp colors, the latter becoming precipitated or curdled to such an extent as to ruin, or at least seriously impair its spreading qualities, and also that such a coating solution will not keep sufficiently long to allow one to make up a quantity sufficiently large to last a mill even a few days. This deleterious action I believe to be due to the presence of a relatively large amount of alkali as the solvent for the casein, though it may be due to other causes originating in the process employed for precipitating the casein from the milk. In any event, these objections are obviated by the present method of precipitation, and the casein produced according to my discovery may be employed with superior results with acid colors and in relations where casein solutions of the ordinary alkalinity cannot be used.

My invention involves also other advantages in respect of the cost of manufacture and the quality of the product.

My process is carried out as follows: Instead of using any of the acids commonly used for curdling milk, I use hydrofluoric acid, precipitating the milk by using about one pint to one quart of the ordinary commercial acid to one thousand quarts of milk, the amount used depending upon the acidity which the milk has already attained. In any case, enough acid is used to thoroughly curdle the milk and leave a clear supernatant liquid, which is commonly called whey. I have found it more satisfactory to dilute the commercial acid with three or four, or more, parts of water, or to such an extent that it has no appreciable corrosive action on glass; and then after having heated the milk, which is contained in any suitable vessel, to about 120° F. or more, to sprinkle the acid thoroughly over the milk, stirring it rapidly into the milk, when, in a few minutes, a complete curdling takes place, the curd settling to the bottom of the vessel, giving a clear, supernatant, liquid. After this liquid or whey has been removed from the vessel by any suitable means, the remaining curd may be washed with water, if desired, to more thoroughly remove any portions of the acid which may be left in it. It is then dried by usual means, well known in this art, and is ready for grinding or to be put upon the market.

The product of the above mentioned process is a caseinate of hydrofluoric acid, composed of a small amount of hydrofluoric acid combined with the casein of the milk. It has the advantage of dissolving with a very small amount of alkali. For example, one may easily dissolve it with seven per cent. of borax, whereas ordinary caseins now on the market require two or three times this amount of alkali. The product is also capable of being made to test absolutely neutral, or to test slightly acid to litmus paper, and still be in a perfectly dissolved state, by diminishing the amount of alkali to the point where the casein is dissolved and is still acid to litmus. I have found in a general way that six parts of borax or equivalent alkali and ninety-four parts of casein, when mixed with about four hundred parts of water, then heated to about 150° F., will become thoroughly dissolved and possess adhesive properties suitable for sizing purposes and still remain acid to litmus paper, with a result that this solution can be used in special lines of industry, such as the wall paper "colors" above mentioned, and, at the same time, will not change the shade of colors or curdle the colors so that they have no flowing properties. I have also found that the product will keep indefinitely without decomposing.

Having described my invention, what I claim and desire to secure by United States Letters Patent is:

1. A process of producing a casein compound suitable for coating, which consists in treating milk with hydrofluoric acid in sufficient quantity to precipitate the casein therefrom, and then separating the casein and whey.

2. A process of producing a casein compound suitable for coating, which consists in curdling milk with commercial hydrofluoric acid diluted to such an extent that it has no appreciable corrosive action upon glass, and when separating the precipitated casein from the whey.

3. A process of producing a casein compound suitable for coating, which consists in heating milk and mixing commercial hydrofluoric acid therewith, in the proportion of one pint to one quart of acid to one thousand quarts of milk and then separating the casein from the whey.

4. A composition of matter consisting of casein and hydrofluoric acid.

5. A solution for sizing purposes consisting of approximately 94% of caseinate of hydrofluoric acid, and six per cent. of borax, mixed with water, substantially as described.

6. The method of producing casein from milk, which consists in adding to the milk substantially one tenth of one per cent. of hydrofluoric acid.

In testimony whereof, I have signed my name to the specification in the presence of two subscribing witnesses.

HENRY V. DUNHAM.

Witnesses:
WALTER J. ROIDER,
LOUIS H. SMITH.

---

Correction in Letters Patent No. 897,885.

It is hereby certified that in Letters Patent No. 897,885, granted September 8, 1908, upon the application of Henry V. Dunham, of Bainbridge, New York, for an improvement in "the Manufacture of Casein," an error appears in the printed specification requiring correction, as follows: In line 14, page 2, the word "when" should read *then*; and that the said Letters Patent should be read with this correction therein that the same may conform to the record of the case in the Patent Office.

Signed and sealed this 29th day of September, A. D., 1908.

[SEAL.]

E. B. MOORE,
*Commissioner of Patents.* claim and desire to secure by United States Letters Patent is:

1. A process of producing a casein compound suitable for coating, which consists in treating milk with hydrofluoric acid in sufficient quantity to precipitate the casein therefrom, and then separating the casein and whey.

2. A process of producing a casein compound suitable for coating, which consists in curdling milk with commercial hydrofluoric acid diluted to such an extent that it has no appreciable corrosive action upon glass, and when separating the precipitated casein from the whey.

3. A process of producing a casein compound suitable for coating, which consists in heating milk and mixing commercial hydrofluoric acid therewith, in the proportion of one pint to one quart of acid to one thousand quarts of milk and then separating the casein from the whey.

4. A composition of matter consisting of casein and hydrofluoric acid.

5. A solution for sizing purposes consisting of approximately 94% of caseinate of hydrofluoric acid, and six per cent. of borax, mixed with water, substantially as described.

6. The method of producing casein from milk, which consists in adding to the milk substantially one tenth of one per cent. of hydrofluoric acid.

In testimony whereof, I have signed my name to the specification in the presence of two subscribing witnesses.

HENRY V. DUNHAM.

Witnesses:
WALTER J. ROIDER,
LOUIS H. SMITH.

---

Correction in Letters Patent No. 897,885.

It is hereby certified that in Letters Patent No. 897,885, granted September 8, 1908, upon the application of Henry V. Dunham, of Bainbridge, New York, for an improvement in "the Manufacture of Casein," an error appears in the printed specification requiring correction, as follows: In line 14, page 2, the word "when" should read *then*; and that the said Letters Patent should be read with this correction therein that the same may conform to the record of the case in the Patent Office.

Signed and sealed this 29th day of September, A. D., 1908.

[SEAL.]

E. B. MOORE,
*Commissioner of Patents.*

Correction in Letters Patent No. 897,885.

It is hereby certified that in Letters Patent No. 897,885, granted September 8, 1908, upon the application of Henry V. Dunham, of Bainbridge, New York, for an improvement in "the Manufacture of Casein," an error appears in the printed specification requiring correction, as follows: In line 14, page 2, the word "when" should read *then;* and that the said Letters Patent should be read with this correction therein that the same may conform to the record of the case in the Patent Office.

Signed and sealed this 29th day of September, A. D., 1908.

[SEAL.]

E. B. MOORE,
*Commissioner of Patents.*